No. 879,639.
PATENTED FEB. 18, 1908.
R. E. HAYNES.
COTTON PRESS.
APPLICATION FILED OCT. 1, 1907.
6 SHEETS—SHEET 2.
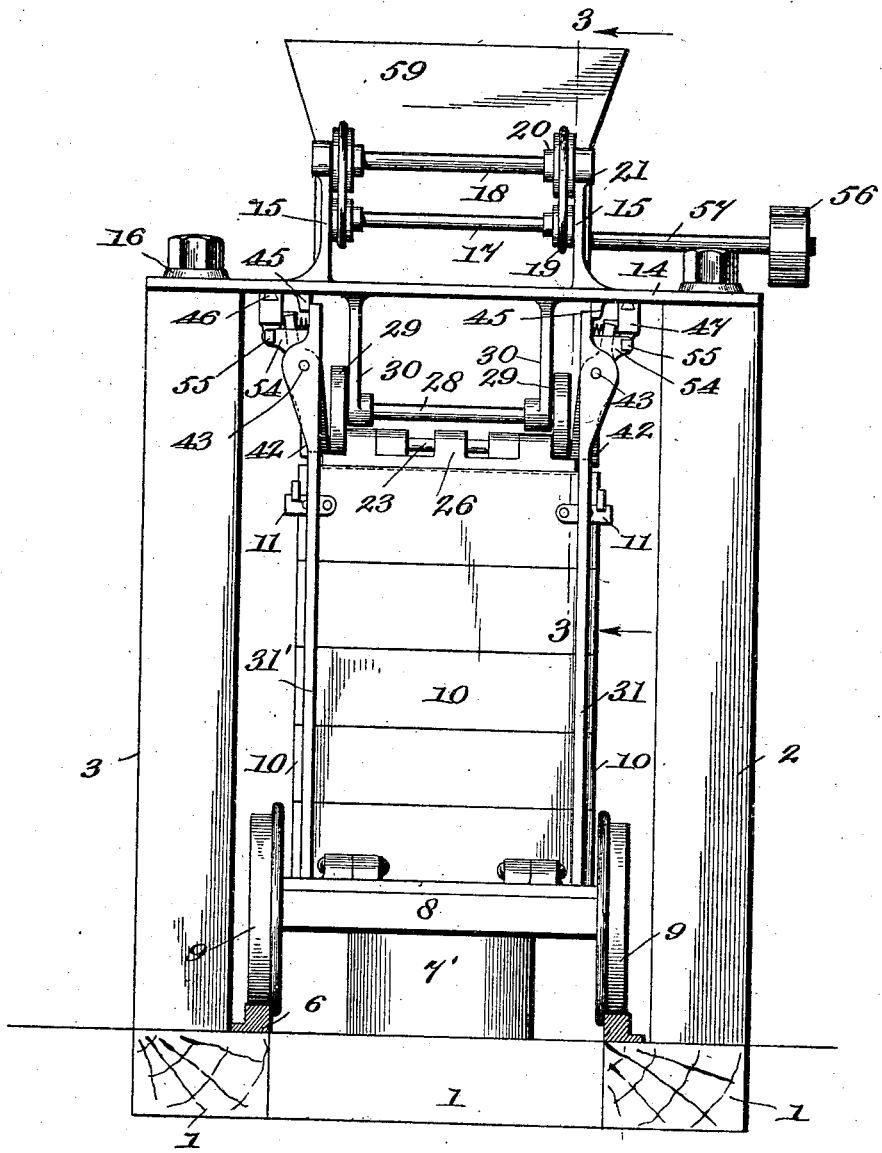

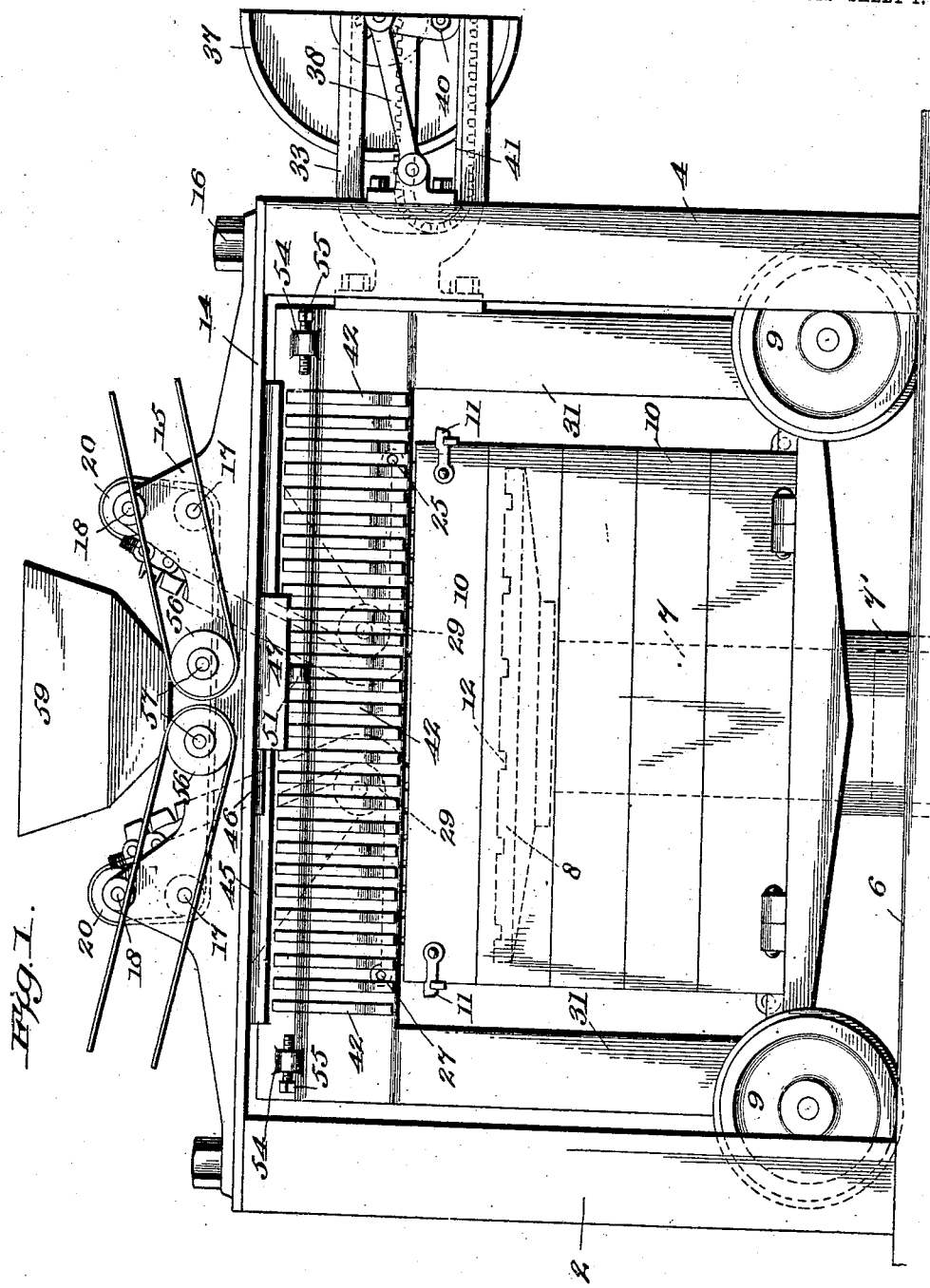

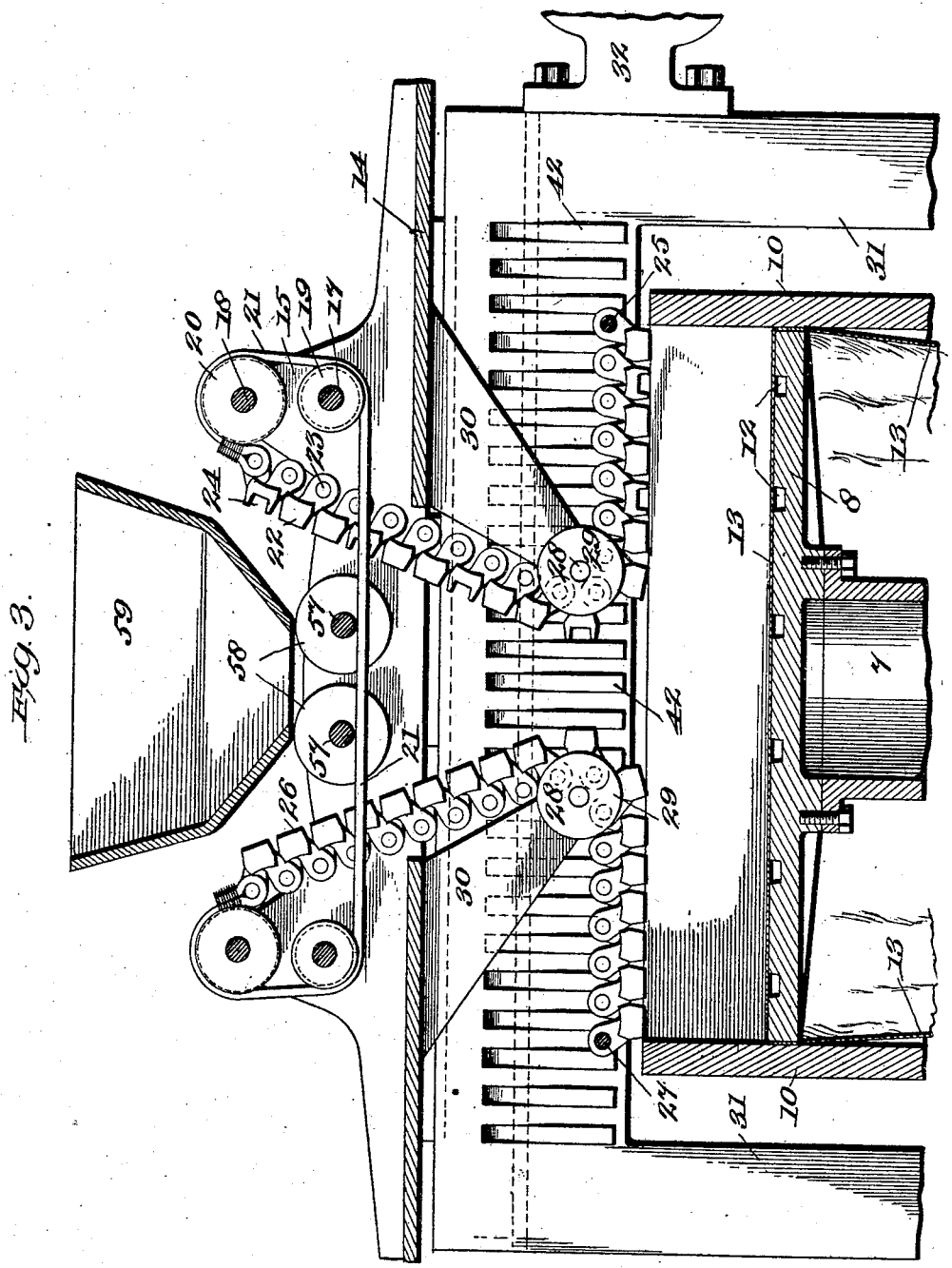

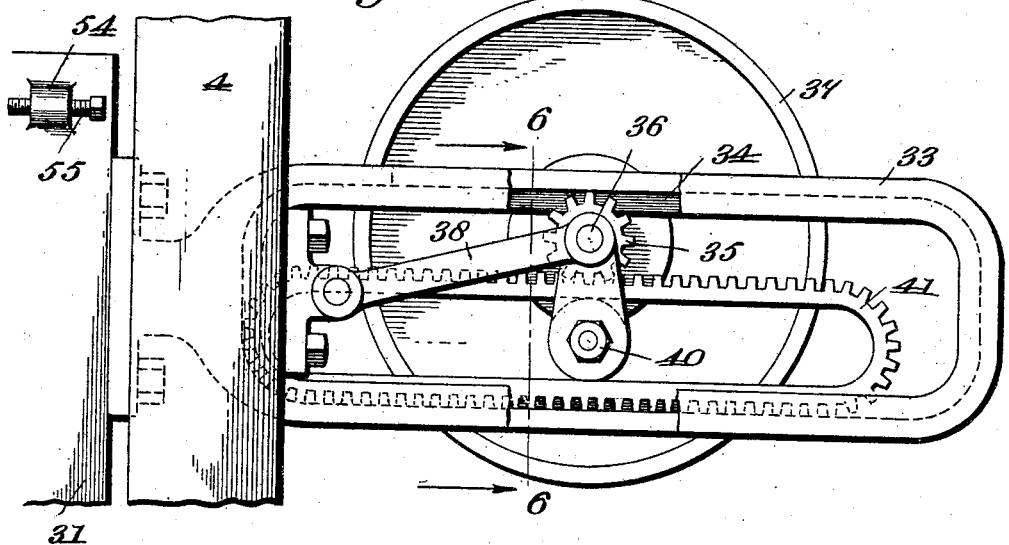
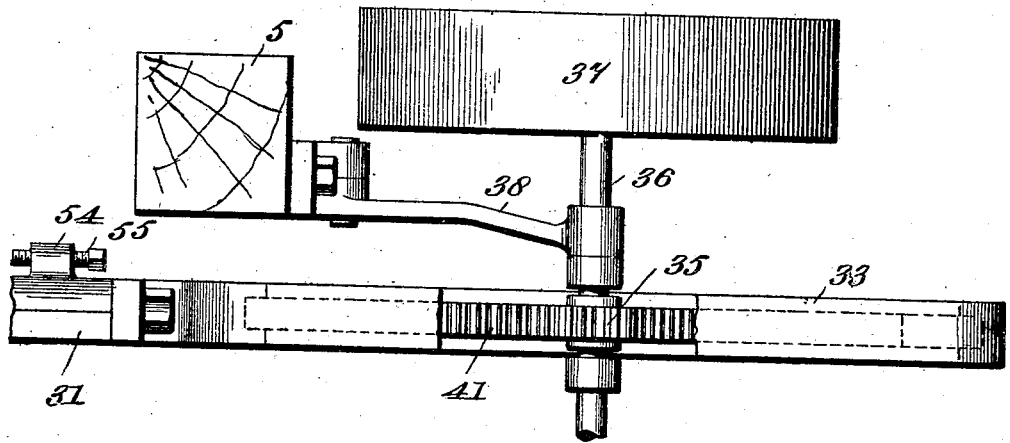
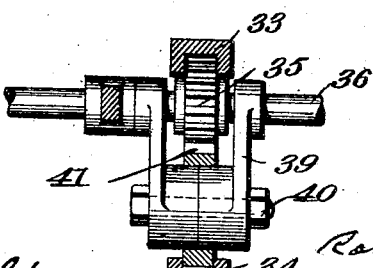

No. 879,639.
R. E. HAYNES.
COTTON PRESS.
APPLICATION FILED OCT. 1, 1907.
PATENTED FEB. 18, 1908.
6 SHEETS—SHEET 5.
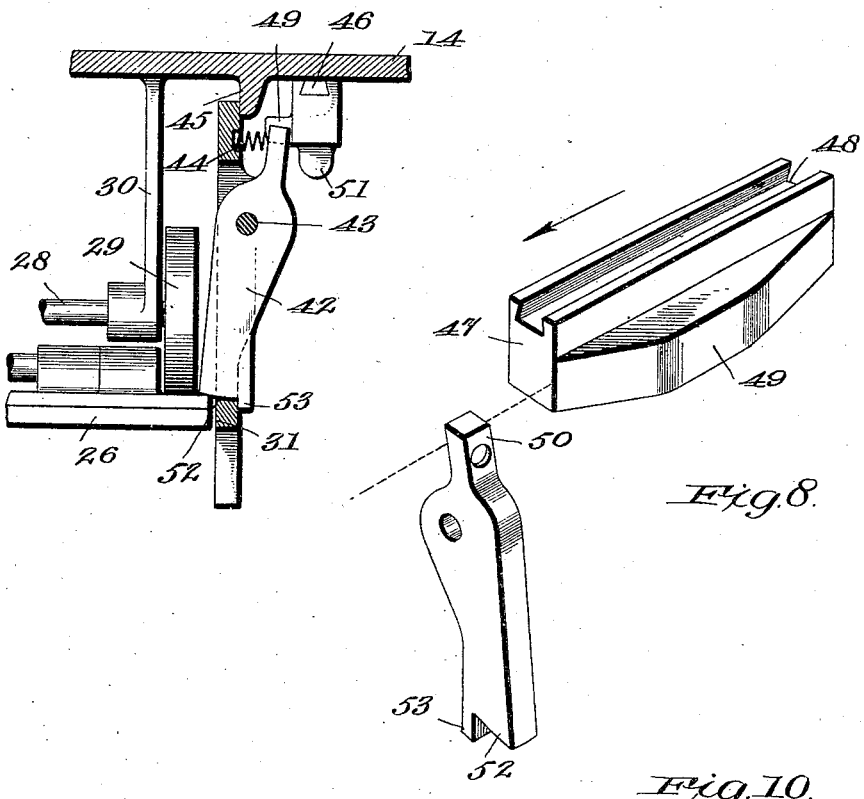
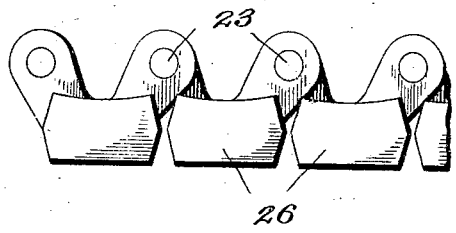
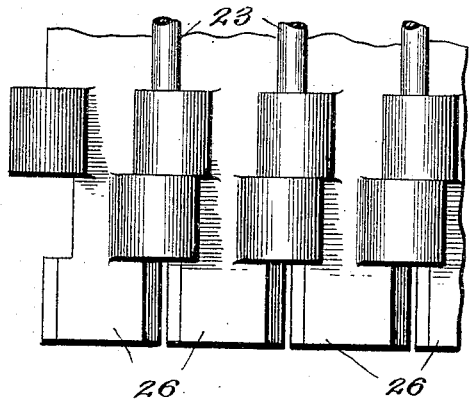
Witnesses
Inventor
Robt. E. Haynes
by Wilkinson Fisher
& Wilkinson
Attorneys No. 879,639.
PATENTED FEB. 18, 1908.
R. E. HAYNES.
COTTON PRESS.
APPLICATION FILED OCT. 1, 1907.
6 SHEETS—SHEET 6.
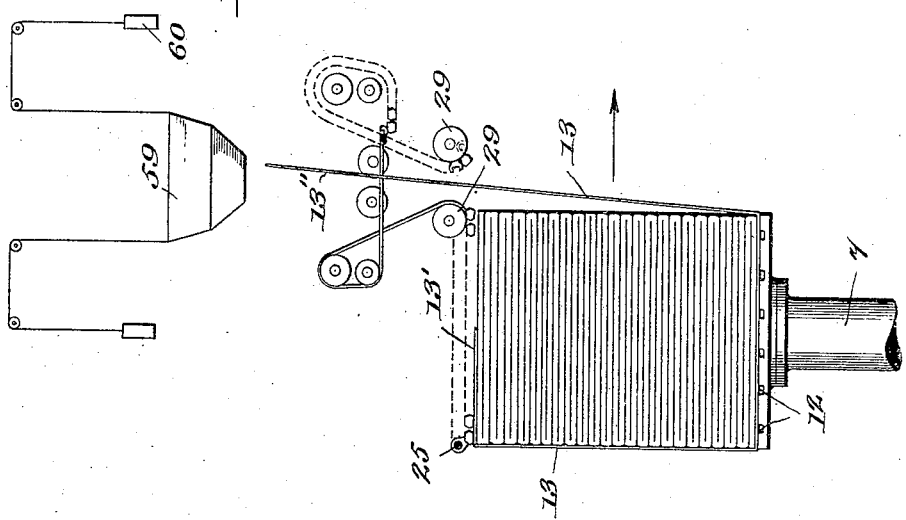
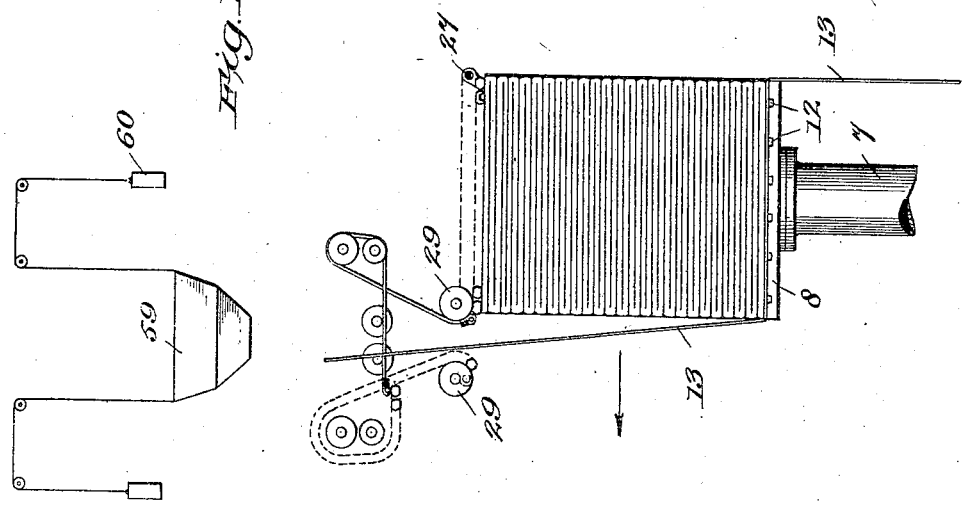
Witnesses
Inventor
Robt E. Haynes
by Wilkinson Fisher
& Wilkinson
Attorneys

UNITED STATES PATENT OFFICE.

ROBERT E. HAYNES, OF SALISBURY, NORTH CAROLINA.

COTTON-PRESS.

No. 879,639.  Specification of Letters Patent.  Patented Feb. 18, 1908.

Application filed October 1, 1907. Serial No. 395,365.

*To all whom it may concern:*

Be it known that I, ROBERT E. HAYNES, a citizen of the United States, residing at Salisbury, in the county of Rowan and State of North Carolina, have invented certain new and useful Improvements in Cotton-Presses; and I do hereby declare the following to be a full, clear, and exact description of the invention, such as will enable others skilled in the art to which it appertains to make and use the same.

My invention relates to improvements in cotton presses, and the object of my invention is to feed the cotton by suitable mechanism to a hopper, thence down between two feed rollers to a baling box and under compressing chains, in layers, with one layer overlapped with another.

It is well known that many attempts have been made heretofore to employ mechanism to compress cotton and other fibrous material by folding the same in layers, but so far as I am aware, none of these devices have met with any degree of commercial success. I have discovered and proved by actual trial that success in this connection can be attained by my invention in which cotton is received from a hopper and conveyed between two feed rollers to a baling box, and under compressing chains, when it is finally baled.

My mechanism comprises a reciprocating platen, and a pressure piston adapted to reciprocate with the platen, and also to reciprocate at right angles thereto.

My invention also comprises an improved jointed compressing device, somewhat resembling the links of a chain, and an improved mechanical movement for reciprocating the platen and its connecting parts, from one side of the press to the other, in the operation of compressing the bale.

My invention further consists in the novel details of construction and combination of parts more fully hereinafter disclosed and particularly pointed out in the claims.

Referring to the accompanying drawings forming a part of this specification, and wherein like numerals refer to like parts in all of the views;—Figure 1 represents a side elevational view of my improved press; Fig. 2, an end elevational view of the same; Fig. 3, a sectional view of a part of my press taken on the line 3—3 of Fig. 2; Fig. 4, a detail view, partly in section, of one of the mechanical movements for reciprocating my platen and its attached parts; Fig. 5, a like view of a duplicate mechanical movement for the same purpose; Fig. 6, a detail of certain parts shown in Fig. 4. Fig. 7, a detail of the mechanism for holding the compressor links in position; Fig. 8, perspective views of the cam and dog, shown in Fig. 7; Fig. 9, an edge view of the compressing links; Fig. 10, a plan view of the same; Fig. 11, a diagrammatic view showing one position of the reciprocating platen with a compressed bale in place; and Fig. 12, a like view of the same in another position.

1, 1 represent any suitable framing forming a support for the mechanism, and from this framing rises four upright heavy timbers 2, 3, 4 and 5. On this bottom frame 1, 1 are two metal tracks 6, 6, as shown, and above said framing rises a hydraulic cylinder 7' the piston 7, of which carries a platen 8, and suitably attached to this platen are the wheels 9 adapted to roll backwards and forwards upon the tracks 6. Rising from this platen is the compressing box of my cotton press provided with the hinged side walls 10, and the latches 11. Through the top surface of my platen 8 are formed the grooves 12, adapted to receive the bale ties. 13 represents the bagging which is to inclose the bale after it is compressed. Extending over the four uprights 2, 3, 4 and 5, is the metal plate 14, cut away at its center, as shown, to form an opening, for the passage of the cotton and compressing chains 22 and 26, and securely fastened to said uprights by the bolts 16. Rising from this plate 14 are the flanges 15, and through said flanges pass the shafts 17 and 18. On the shafts 17 are the grooved rollers 19, and on the shafts 18 are the grooved rollers 20. Over the rollers 19 and 20 on each end of the shafts 17 and 18 pass the bands 21, to each end of which are attached the compressing chains 22 and 26, as best shown in Fig. 3. These compressing chains are provided with links extending across the bale, and have the pivots 23. A plurality of the links of the compressing chain 22 are furthermore provided with the grooves 24, which when the bale is finished match or correspond with the grooves 12 in the upper surface of the platen 8, and serve to receive the bale ties.

The lower end of the compressing chain 22 is fastened at 25, and the lower end of the chain 26 is fastened at 27 to reciprocating frames 31 and 31', more fully hereinafter described.

The top plate 14 is also provided with lugs 30, through which pass shafts 28, which accommodate rollers 29 under which the chains 22 and 26 pass, and are thereby depressed sufficiently to permit the springs 44 to force the dogs 42 over said chains, as shown. When the said chains 22, or 26, are going up the said rollers, again depress each link as it passes the same, and thereby relieve the pressure on the dogs 42, and permit the latter to be released by the cam piece 47 at predetermined intervals.

31 is a reciprocating frame to which is attached the bracket 32 provided with the loop or frame 33 having the groove 34 therein, in which plays the pinion 35 carried by the shaft 36, which in turn is driven by the wheel 37, which constitutes the source of power for reciprocating the platen, and its attached parts. This shaft 36 is connected by the link 38 to the post 4, as best shown in Fig. 4. On this shaft 36 is a U-shaped yoke 39 formed in two parts, as shown in Fig. 6, with a bolt 40 passing therethrough, and the lower portion of which, as well as the said bolt 40, passes through the opening formed in the elliptical floating rack 41. This floating rack 41, when in the position shown in Fig. 4, occupies the lower groove 34 in the loop 33, but when the pinion 35 passes around the end of said rack and raises the same, it occupies the groove 34 in the upper portion of the loop or frame 33, all as will be more fully hereinafter disclosed. Attached to the said reciprocating frame 31 are a series of dogs 42 pivoted on a shaft 43, and controlled by springs 44, as best shown in Fig. 7. The function of these dogs 42, as will appear more fully hereinafter, is to hold down the compressing chains 22 and 26, while the cotton is being compressed. The plate 14 also carries a depending flange 45 against which the upper edge of the reciprocating frame 31 bears, and parallel to this flange 45 is the dove-tailed flange 46, over which fits the cam piece 47 provided with the dove-tailed groove 48. This cam piece 47 is provided with the reversely inclined cam 49, as best shown in Fig. 8, which cam takes against the tails 50 of the dogs 42, and releases the said dogs from the compressing chains at the appropriate time, all as will appear more fully hereinafter. This cam piece 47 is also provided with the depending lug 51, as shown in Fig. 7, and the dogs 42 are provided with the curved lower face 52, and depending flange 53, as shown.

On the frame 31 at each side are lugs 54, Fig. 1, through which pass adjustable screws 55, as shown. These screws contact with the lug 51 on the cam piece 47, and slide the said cam piece along the dove-tailed flange 46 when the frame 31 is at one extreme position or the other.

56 represents any suitable power wheel mounted on a shaft 57 for revolving the roller 58. This wheel 56 is duplicated, as shown in Fig. 1, but the rollers 58 are rotated in opposite directions in order that the cotton may pass from the hopper, down between the feed rollers to the baling box, under the compressing chains where it is baled.

The hopper 59 is vertically movable, as best shown in Figs. 11 and 12, and for this purpose counter-weights 60 are conveniently provided.

The above description relating to the frame 31 also relates to the frame 31' on the opposite side of the compression box in connection with which all the parts are duplicated.

The operation of my device is as follows:—
The cotton is delivered into the hopper 59 from any suitable source, as, for instance, a gin, is passed down between the feed rollers 58, to a baling box, under the compressing chains and above the platen 8. This platen, together with the baling box and the frames 31 and 31' are bodily reciprocated in a horizontal direction by means of the pinion 35, which is fast on the shaft 36, which is rotated by the power wheel 37. There is but one of these pinions 35 on the shaft 36, but there are two arms 38, one on each side of the pinion 35, and this pinion gears into an elliptical floating rack 41, the ends of which take against the ends of the frame 33 and push the same bodily in one direction or the other. That is to say, in the position shown in Fig. 4, if the pinion turns clockwise, the rack 41 will be urged to the left, and with it the frame 33, the loop or frame 31, the compression box and platen, the pinion 35 in the meantime remaining stationary. When this rack 41 has been pushed so far to the left that the pinion 35 reaches the end of the same, the said pinion will ride down over the end of the rack 41, raise the same, and although the said pinion 35 continues to revolve in the same direction, it will now reciprocate the rack 41 to the right and with it the frames 33 and 31, and the platen 8. In the meantime, the rack 41 is raised to occupy the upper groove 34, and when the said pinion 35 reaches the left hand end of the said rack 41, the latter will be again thrown down into the position shown in Fig. 4. In other words, although the wheel 37 continues to revolve in the same direction, this floating rack 41 will cause the parts to continually reciprocate. As the frames 31 and 31' reciprocate, say to the right, as shown in Fig. 3, the compressor chain 22 is carried also to the right and serves to compress the cotton that may be delivered upon the platen 8, and the dogs 42, taking against the flanges of said chain, prevent the same from rising under the pressure to which the cotton is subjected. When the said chain has reached the limit of its movement to the right, the lug 51 on the cam piece 47 strikes against the screw 55 on the left of the machine, as seen in Fig. 1, which causes the said dogs 42 to be released. At this time, the floating rack and pinion, above described, cause the platen and frames 31 and 31' to be reciprocated to the left. This movement causes the chain 26 to be forced down and gradually compress the cotton, while the dogs 42 pass over the flanges of the same, as shown in Fig. 7, and hold them firmly against the cotton. When the platen has reached the limit of its stroke to the left, the said lug 51 then strikes against the set screw 55 on the right of the machine and causes the said dogs 42 to be released from the said chain 26. In the meantime, the chain 22 has been withdrawn from the compressor box and is now ready to be forced down again into position to compress the cotton. This action may be gathered from Figs. 11 and 12, which show the successive layers of the cotton after they have been forced into the compressor box and piled up on each other.

Fig. 11 shows the platen and compressed cotton, after it has made its full movement to the left, and Fig. 12 shows the same after it has made its full movement to the right.

The action above described continues until a full bale has been fed into the compressor box, when the machine is stopped, the sides 10 of the box unlatched, and the bagging 13 on the one side, see Fig. 12, is pressed up between the rollers 29, as shown. The platen and bale are now reciprocated to the left, as seen in Fig. 12, and the end 13' of the bagging 13 is thereupon folded down into the position shown in Fig. 11. The other side of the bagging 13 is now passed up between the rollers 29, and the compressor box reciprocated to the right, whereupon the other end of the bagging 13' is folded down upon the bale. In this position, the chain 22 will be flat down upon the cotton, and its grooves 24 will lie above the grooves 12 in the top surface of the platen 8. Bale ties are now passed through the grooves 12 and 24 around the bale, and the same is finished.

Of course when the compressing is finished, the hopper 59 is raised up out of the way, as shown in Figs. 11 and 12. The feed rollers 58 may be placed as close together as desired, and the cotton compressed and fed to the baling box, under the compressing chains in layers, or bats of any desired thickness; and, also, any desired degree of pressure may be maintained in this box by regulating the hydraulic pressure governing the platen 8. Furthermore, when a very compact bale is desired, the said platen 8 may be subjected to a final compressing force, by turning on more pressure from the hydraulic press after the bale is finished.

Having now described my invention, what I claim is:—

1. In a baling press the combination of means for feeding the material in a continuous layer, with reciprocating means for feeding the said layer into a compressing box, and dogs for maintaining a pressure on said last mentioned feeding means, substantially as described.

2. In a baling press the combination of rollers for feeding the fiber in a continuous layer, with reciprocating compressing chains for feeding the said layer into a compressing box, and pivoted dogs for maintaining a pressure on said chains, substantially as described.

3. In a cotton baling press, the combination of a baling box having the hinged walls 10, with rollers 58 for feeding the cotton in a continuous layer, chains 22 and 26 for pressing and feeding said layer into said box, pivoted dogs 42 for maintaining a continuous pressure on one or the other of said chains, and means to release said dogs at intervals, substantially as described.

4. In a cotton baling press the combination of a baling box, means to reciprocate the same, means to feed the cotton in a continuous layer, compressing chains to feed said layer into said box, means to reciprocate said chains, and pivoted dogs, to hold said compressing chains in place, substantially as described.

5. In a cotton baling press the combination of a baling box, means to reciprocate the same, means to feed the cotton in a continuous layer, compressing chains to feed said layer into said box, means to reciprocate said chains, pivoted dogs to hold said compressing chains in place, and reciprocating means adapted to release said dogs at predetermined intervals, substantially as described.

6. In a cotton baling press the combination of a baling box, provided with a reciprocating platen, means to reciprocate the same, means to feed the cotton in a continuous layer, compressing chains to feed said layer into said box, means to reciprocate said chains, and pivoted dogs to hold said compressing chains in place, substantially as described.

7. In a cotton baling press the combination of a baling box, provided with a reciprocating platen adapted to be controlled by hydraulic pressure, reciprocating frames 31 and 31' means to reciprocate said platen and frames, means to feed the cotton in a continuous layer, compressing chains to feed said layer into said box, means to reciprocate said chains, and pivoted dogs to hold said compressing chains in place, substantially as described.

8. In a cotton baling press the combination of a baling box, provided with a reciprocating platen adapted to be controlled by hydraulic pressure, reciprocating frames 31 and 31', means to reciprocate said platen and frames, means to feed the cotton in a continuous layer, compressing chains secured to said frames 31 and 31' to feed said cotton into said box, and pivoted dogs 42, also carried by said frames adapted to hold said chains in place, substantially as described.

9. In a cotton baling press the combination of a baling box provided with a pressure controlled platen having the bale-tie receiving grooves 12 in its upper face, frames 31 and 31', means adapted to reciprocate said platen and frames, means to feed the cotton in a continuous layer, compressing chains, one of which is provided with the grooves 24, adapted to feed the cotton into said box, connections between said chains and said frames, pivoted dogs to hold said chains in place, and means to automatically release said dogs at predetermined intervals, substantially as described.

10. In a cotton baling press, the combination of a baling box, means for feeding the cotton in a continuous layer, means for feeding the same into said box, and means to hold the said feeding means in place, consisting of the pivoted dogs 42, provided with the lugs 53, and means to release said dogs from their holding positions, consisting of the cam piece 47, substantially as described.

11. In a cotton press, the combination of means for compressing the cotton, means for holding the said compressing means in place, consisting of the pivoted dogs 42, provided with the curved faces 52, the lugs 53, with the cam piece 47, provided with the cam 49 and the lug 51, and the releasing screws 54, substantially as described.

12. In a cotton baling press, the combination of means for compressing the cotton, means for holding the compressing means in place, consisting of the rollers 29 and the dogs 42, provided with the faces 52, with the cam piece 47 provided with the cam 49, and the releasing screws 55, substantially as described.

13. In a cotton baling press, the combination of means for feeding the material in a continuous layer, with reciprocating means for feeding said layer into a baling box, consisting of the loop or frame 33, the floating rack 41, the pinion 35 adapted to contact with said rack, and the power wheel 37, substantially as described.

14. In a cotton baling press, the combination of means for feeding the cotton in a continuous layer, with reciprocating means for feeding the said layer into a baling box, dogs for maintaining a pressure on said feeding means, and means for reciprocating said dogs, consisting of the loop or frame 33, provided with the groove 34, the rack 41 adapted to rise and fall in said groove, the pinion 35 engaging said groove and rack, and a power wheel 37, substantially as described.

15. In a baling press for cotton, the combination with means for compressing the cotton, with means for reciprocating said compressing means, consisting of the frame or loop 33 connected to said compressing means and provided with the groove 34, the pinion 35 moving in said groove, the link 38 connecting said pinion to the frame of the press, the floating track 41 with which said pinion engages, and the V-shaped yoke 39 engaging said pinion, substantially as described.

16. In a cotton baling press, the combination of compressing means, with means to reciprocate the same consisting of the loop or frame 33, provided with the groove 34, the loose floating elliptical rack 41, adapted to rise and fall in said loop or frame, the pinion 35 adapted to engage said groove and rack, the U-shaped yoke 39 engaging said elliptical floating rack, the link 38 connected to the frame of the press, the shaft 36 on which said pinion and link are secured, and the power wheel 37 on said shaft, substantially as described.

17. In a cotton baling press, the combination of a loop or frame 33 provided with the groove 34, the elliptical floating rack 41 located within said loop, the pinion 35 engaging said rack and groove, and the yoke 39 passing between the members of said rack, substantially as described.

18. In a cotton baling press, the combination of the press proper, with means for reciprocating the same, consisting of the elliptical loop or frame 33, provided with the elliptical groove 34 on its interior, the elliptical rack 41, adapted to rise and fall, and to be reciprocated in said groove 34, a pinion 35 engaging said groove, and the teeth of said rack, and adapted to pass over the end of said rack, raise the same and thereby reverse the movement of the press, a shaft 36 passing through said pinion, a link 38 connecting said shaft and the frame of the press, and a source of power 37 for rotating said pinion, substantially as described.

19. In a cotton baling press, the combination of a baling box, means to reciprocate the same, consisting of the loop 33, the pinion 35, and floating frame 41, means to feed the cotton in a continuous layer, compressing chains to feed said layer into said box, means to reciprocate said chains, and pivoted dogs to hold said compressing chains in place, substantially as described.

20. In a cotton baling press, the combination of a baling box, means to reciprocate the same, consisting of the loop 33, the pinion 35, and floating frame 41, means to feed the cotton in a continuous layer, compressing chains to feed said layer into said box, means to reciprocate said chains, pivoted dogs to hold said compressing chains in place, and reciprocating means adapted to release said dogs at predetermined intervals, substantially as described.

21. In a cotton baling press, the combination of a baling box, provided with a reciprocating platen, adapted to be controlled by hydraulic pressure, reciprocating frames 31 and 31', means to reciprocate said platen and frames, consisting of the elliptical loop 33, the floating frame 41, and the pinion 35, means to compress the cotton into a continuous layer, compressing chains to feed said layer into said box, means to reciprocate said chains, and pivoted dogs to hold said compressing chains in place, substantially as described.

22. In a cotton baling press, the combination of a baling box, provided with a reciprocating platen, adapted to be controlled by hydraulic pressure, recpirocating frames 31 and 31', means to reciprocate said platen and frames, consisting of the frame or loop 33, the floating frame 41, the pinion 35, and connecting link 38, means to compress the cotton into a continuous layer, compressing chains to feed said layer into said box, pivoted dogs to hold said compressing chains in place, and means to release said dogs from their holding position, consisting of the cam piece 47, and the releasing screws 55, substantially as described.

23. In a cotton baling press, the combination of a compressing box, provided with a pressure controlled platen, having the bale-tie receiving grooves 12 in its upper face, frames 31 and 31', means adapted to reciprocate said platen and frames, consisting of the frame or loop 33, the pinion 35, and the floating rack 41, means to compress the cotton into a continuous layer, compressing chains attached to said frames 31 and 31', one of said compressing chains being provided with the grooves 24 and said chains adapted to feed the cotton into said box, pivoted dogs carried by said frames 31 and 31', adapted to hold said chains in place, and means adapted to automatically release said dogs at predetermined intervals, substantially as described.

24. In a baling press the combination of a power controlled platen, having bale-tie receiving grooves through its upper face, and adapted to have the bagging for the material placed over said face and grooves before the compression takes place, and a compressing chain having corresponding grooves through some of its links, adapted to stand opposite said first mentioned grooves when the bale is finished, substantially as described.

25. In a cotton baling press the combination of a power controlled platen having bale-tie receiving grooves in its upper face, and adapted to receive the bagging for the cotton over said grooves, before the same is compressed and to permit said bagging to hang down over its edges while the compression is going on, compressing chains, one of which is provided with corresponding bale-tie receiving grooves, and means to reciprocate said platen and chains, whereby after the bale is compressed the bagging may be passed up over the same, and firmly and smoothly pressed by said chains in place, substantially as described.

26. In a cotton baling press the combination of a compressing box having hinged walls and a power controlled platen having bale-tie receiving grooves in its upper face, and adapted to receive the bagging for the cotton over said grooves, before the same is compressed and to permit said bagging to hang down over its edges while the compression is going on, compression chains, one of which is provided with corresponding bale-tie receiving grooves, and means to reciprocate said platen and chains, whereby, after the bale is compressed the bagging may be passed up over the same, firmly and smoothly pressed by said chains in place, and the bale-ties passed through said grooves and secured around the bale, substantially as described.

27. In a cotton baling press the combination of a vertically movable hopper, a compressing box having hinged side walls, a platen having bale-tie receiving grooves in its upper face, and adapted to receive the bagging over the same, power means to reciprocate said platen vertically, power means to reciprocate the same horizontally, compressing chains, one of which is provided with bale-tie receiving grooves corresponding to those in the platen, and means whereby said bagging may be passed up over the bale, smoothed and stretched into place by said chains and their connecting parts, and then the bale-ties fastened in place before the pressure is taken off the bale, substantially as described.

In testimony whereof, I affix my signature in presence of two witnesses.

ROBERT E. HAYNES.

Witnesses:
J. M. KING,
S. M. PURCELL.